United States Patent
Hughes

(10) Patent No.: US 10,488,428 B1
(45) Date of Patent: Nov. 26, 2019

(54) INSECT REPELLENT PITOT TUBE COVER

(71) Applicant: Philip S. H. Hughes, San Antonio, TX (US)

(72) Inventor: Philip S. H. Hughes, San Antonio, TX (US)

(*) Notice: Subject to any disclaimer, the term of this patent is extended or adjusted under 35 U.S.C. 154(b) by 148 days.

(21) Appl. No.: 15/924,000

(22) Filed: Mar. 16, 2018

(51) Int. Cl.
*G01P 5/165* (2006.01)
*A01M 29/12* (2011.01)
*A01M 29/34* (2011.01)

(52) U.S. Cl.
CPC ............ *G01P 5/165* (2013.01); *A01M 29/12* (2013.01); *A01M 29/34* (2013.01)

(58) Field of Classification Search
None
See application file for complete search history.

(56) References Cited

U.S. PATENT DOCUMENTS

| | | | | |
|---|---|---|---|---|
| 5,026,001 A | * | 6/1991 | Wright | B64F 1/005 150/154 |
| 5,127,265 A | * | 7/1992 | Williamson | B64F 1/005 150/154 |
| 5,938,147 A | * | 8/1999 | DeGroff | B64F 1/005 244/1 R |
| 8,132,471 B2 | * | 3/2012 | DeGroff | B64F 1/005 73/861.65 |
| 9,174,743 B2 | * | 11/2015 | Dis | B64D 45/00 |
| 9,682,787 B2 | * | 6/2017 | Dis | B64F 1/005 |
| 2005/0221028 A1 | * | 10/2005 | Westcott | A01M 1/20 428/34.1 |
| 2016/0059967 A1 | * | 3/2016 | Tjeenk Willink | F01D 5/288 427/230 |

* cited by examiner

*Primary Examiner* — Natalie Huls
*Assistant Examiner* — Jermaine L Jenkins
(74) *Attorney, Agent, or Firm* — Plager Schack LLP; Mark H. Plager; Kara Verryt

(57) ABSTRACT

An insect repellent pitot tube cover for reducing or preventing entry of insects and spiders into an aircraft's pitot tube may include a pitot tube cover sized and shaped to at least partially encase a pitot tube on an aircraft; and an insecticide applied to the pitot tube cover. The insecticide may be any conventional insecticide, such as pyrethrin or permethrin.

4 Claims, 2 Drawing Sheets

INSECT REPELLENT PITOT TUBE COVER

BACKGROUND

The embodiments herein relate generally to aviation products, and more particularly, to an insect repellent pitot tube cover.

Insects and spiders can block an aircraft's pitot tube with their bodies or webs. This makes the air speed indicator unreliable, which can cause a catastrophic accident.

Standard pitot tube covers either loosely cover the whole pitot tube or only tightly cover the opening hole, leaving the drain hold unprotected. This allows access for insects or spiders and their webs, which can then block the holes in the pitot tube. Thus, standard pitot tube covers allow the ingress of insects and spiders.

Therefore, what is needed is a pitot tube cover that not only provides a physical barrier against insects and spiders, but also provides a chemical barrier to insects and spiders entering the pitot tube on an aircraft.

SUMMARY

Some embodiments of the present disclosure include an insect repellent pitot tube cover for reducing or preventing entry of insects and spiders into an aircraft's pitot tube. The insect repellent pitot tube cover may include a pitot tube cover sized and shaped to at least partially encase a pitot tube on an aircraft; and an insecticide applied to the pitot tube cover. The insecticide may be any conventional insecticide, such as pyrethrin or permethrin

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The composition of the present disclosure may be used as a physical and chemical barrier to reduce or prevent insects and spiders from entering an aircraft's pitot tube and may comprise the following elements. This list of possible constituent elements is intended to be exemplary only, and it is not intended that this list be used to limit the composition of the present application to just these elements. Persons having ordinary skill in the art relevant to the present disclosure may understand there to be equivalent elements that may be substituted within the present disclosure without changing the essential function or operation of the composition.

a. Pitot Tube Cover
b. Insecticide

The various elements of the composition of the present disclosure may be related in the following exemplary fashion. It is not intended to limit the scope or nature of the relationships between the various elements and the following examples are presented as illustrative examples only.

Figure 1:
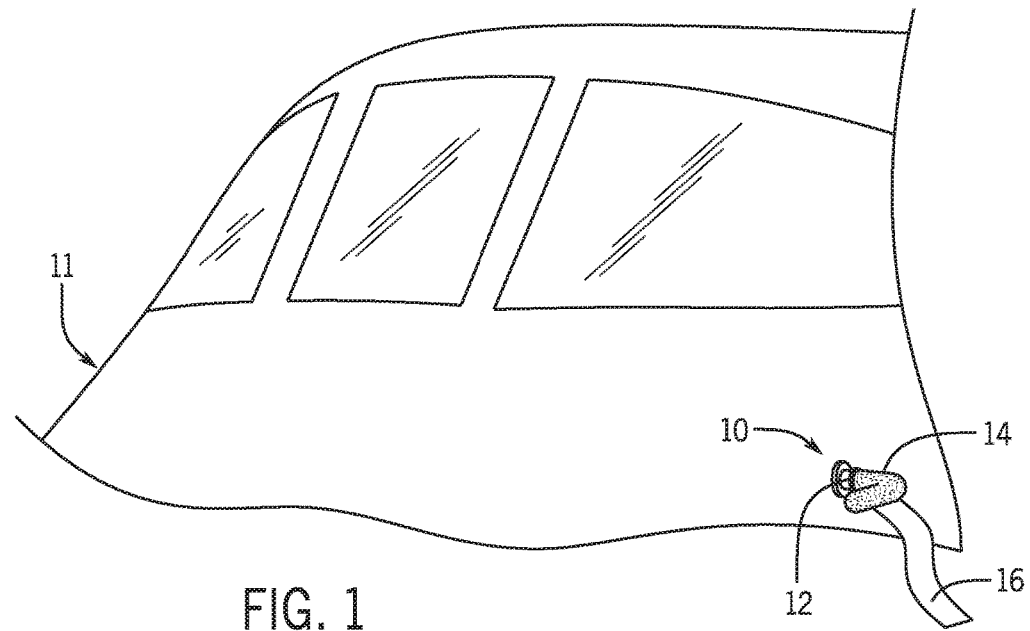
FIG. 1 is a side perspective view of one embodiment of the present disclosure in use.
Figure 2:
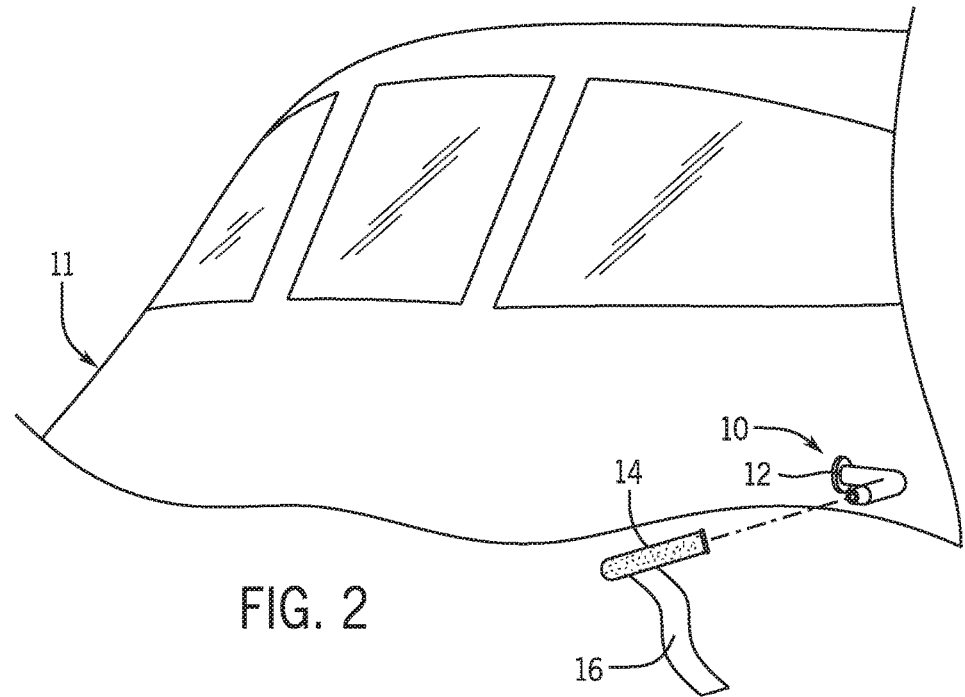
FIG. 2 is an exploded perspective view of one embodiment of the present disclosure.
Figure 3:
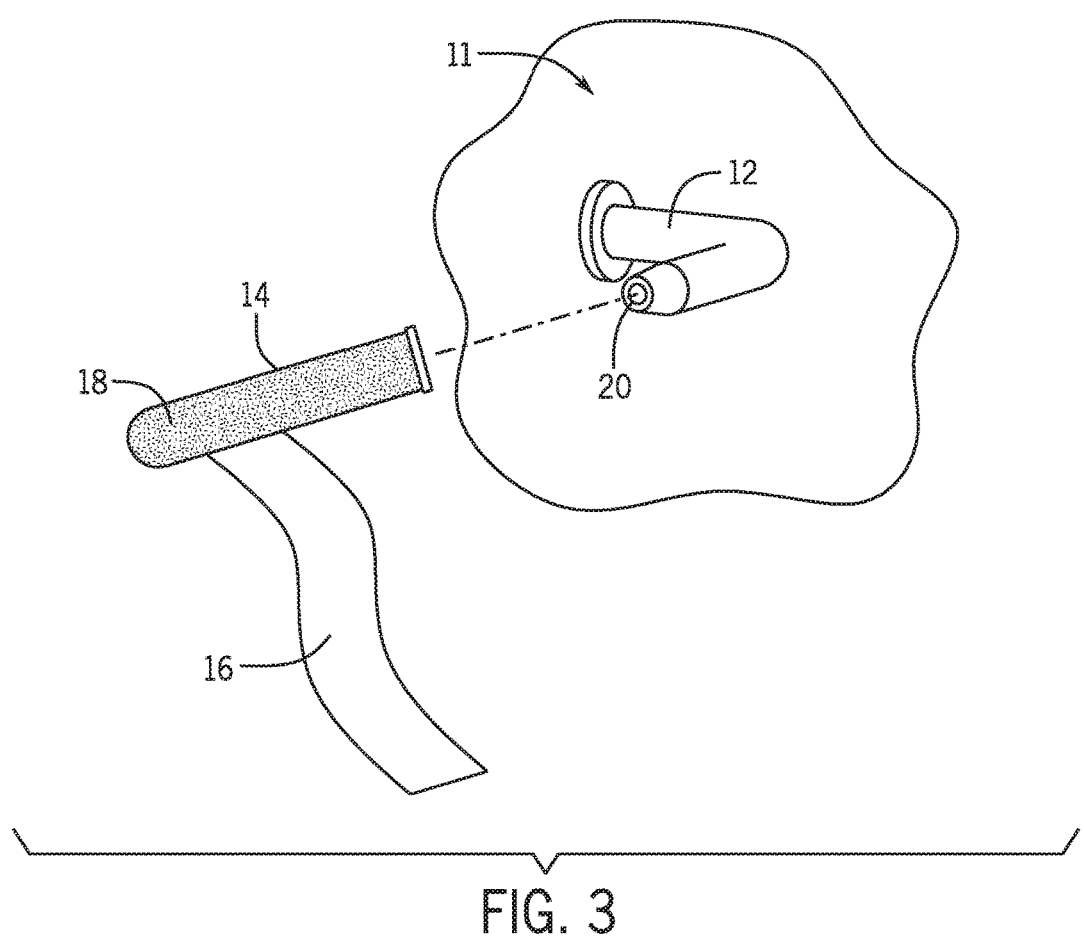
FIG. 3 is an enlarged perspective view of one embodiment of the present disclosure.

By way of example, and referring to FIGS. 1-3, some embodiments of the present disclosure include an insect repellent pitot tube cover 10 for reducing or preventing entry of insects and spiders into an aircraft's pitot tube, the insect repellent pitot tube cover 10 comprising a pitot tube cover 14 sized and shaped to at least partially encase a pitot tube 12, including the opening 20 in the pitot tube 12, on an aircraft 11; and an insecticide 18 applied to the pitot tube cover 14. As shown in the Figures, the insect repellent pitot tube cover 10 may further comprise a warning banner 16 extending from the pitot tube cover 14, wherein the warning banner 16 may function to alert a user that the pitot tube 12 has a cover applied thereto, wherein the cover should be removed before operating the aircraft 11.

The insecticide 18 may include any desired or known insect repellent, such as pyrethrin or synthetic insecticides such as permethrin, wherein the insecticide 18 may be applied to the pitot tube cover 14 using any conventional methods. For example, a material used to make the pitot tube cover 14 may be treated with insecticide by soaking the material, spraying the material, or otherwise impregnating the material with the insecticide 18. Alternatively or additionally, the material used to make the pitot tube cover 14 may comprise a material with natural insect repellent properties. Moreover, the insecticide 18 may be applied directly to the pitot tube 12 itself before the pitot tube cover 14 is placed thereon.

Because of the structure of the insect repellent pitot tube cover 10 of the present disclosure, the cover may provide both a physical barrier and a chemical barrier to insects and spiders.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An insect repellent pitot tube cover for reducing or preventing entry of insects and spiders into an aircraft's pitot tube, the insect repellent pitot tube cover comprising: a pitot tube cover sized and shaped to at least partially encase a pitot tube on an aircraft; and an insecticide applied to the pitot tube cover wherein the insecticide covers, soaks or impregnates the pitot tube cover.

2. The insect repellent pitot tube cover of claim 1, further comprising a warning banner extending from the pitot tube cover.

3. The insect repellent pitot tube cover of claim 1, wherein the insecticide is selected from the group consisting of pyrethrin and a synthetic insecticide.

4. The insect repellent pitot tube cover of claim 1, wherein:
the insecticide comprises a synthetic insecticide; and
the synthetic insecticide comprises permethrin.